(12) United States Patent
Li et al.

(10) Patent No.: US 8,311,535 B2
(45) Date of Patent: Nov. 13, 2012

(54) METHOD FOR CONTROLLING INFORMATION TRACE AND CORE NETWORK ELEMENT

(75) Inventors: Lianyuan Li, Beijing (CN); Shaoling Sun, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 416 days.

(21) Appl. No.: 12/450,526

(22) PCT Filed: Apr. 8, 2008

(86) PCT No.: PCT/CN2008/000714
§ 371 (c)(1),
(2), (4) Date: Jan. 13, 2010

(87) PCT Pub. No.: WO2008/122209
PCT Pub. Date: Oct. 16, 2008

(65) Prior Publication Data
US 2010/0130191 A1    May 27, 2010

(30) Foreign Application Priority Data
Apr. 9, 2007  (CN) .......................... 2007 1 0065276

(51) Int. Cl.
*H04W 4/00* (2009.01)

(52) U.S. Cl. ...................... 455/433; 455/410; 455/432.3
(58) Field of Classification Search ................. 455/410, 455/432.3, 435.1, 456.1, 67.11
See application file for complete search history.

(56) References Cited

U.S. PATENT DOCUMENTS 7,929,512 B2 *   4/2011   Malomsoky et al. .......... 370/345
7,957,393 B2 *   6/2011   Lundin .................... 370/395.21

FOREIGN PATENT DOCUMENTS

| CN | 1756183 A | 4/2006 |
|----|-----------|--------|
| CN | 101060430 A | 10/2007 |
| WO | WO 99/65261 A2 | 12/1999 |

OTHER PUBLICATIONS

International Search Report issued in International Application No. PCT/CN2008/000714 on Jul. 17, 2008.

* cited by examiner

*Primary Examiner* — Temica M Beamer
(74) *Attorney, Agent, or Firm* — Oliff & Berridge, PLC

(57) ABSTRACT

A method for controlling information trace, wherein MSISDN number information is converted to IMSI and/or IMEI number information automatically in a core network element, therefore only MSISDN needs to be provided when a user requires to be performed information trace. Moreover, during information trace, no information needs to be recorded and converted according to MSISDN in advance.

6 Claims, 3 Drawing Sheets

METHOD FOR CONTROLLING INFORMATION TRACE AND CORE NETWORK ELEMENT

FIELD OF THE INVENTION

The present invention relates to mobile communication technology, and in particular, to a technology of information trace.

BACKGROUND OF THE INVENTION

Trace refers to the record of user information that conforms to a specific condition on a user terminal or a mobile communication network element. There are two modes for starting trace function: management-based mode and signaling-based mode; where, in management-based mode, a network management console sends a command to each network element that needs to start trace function, and the network element that receives the command starts the related trace function; in signaling-based mode, trace function is started stage by stage, and the network management console sends a trace function start command to each of the first stage network elements that needs to start trace function, where the trace function start command includes information of a traced object, condition for each network element to start trace function, the next stage network element that needs each network element to start trace function and condition to send a trace function start command to the next stage network element. Each network element starts trace function when the corresponding trace start condition is met, and it sends a trace function start command to the next stage network element that needs to start trace function when the condition to send a trace function start command to the next stage network element is met.

In the existing mobile communication technologies, when call connection is established between mobile communication users or between a mobile communication user and other fixed communication network users or integrated services digital network users, various identification numbers are needed, typically as follows.

1) International Mobile Station Identify (IMSI): IMSI is shorted as user identity, for identifying a user in a Global System Mobile (GSM) or a Public Land Mobile Network (PLMN).

2) International Mobile Station Equipment Identity (IMEI): IMEI is the unique number information for identifying a mobile network element.

3) Mobile Subscriber Integrated Services Digital Network Number (MSISDN): MSISDN is user mobile phone number, which is the number for a Public Switch Telephone Network (PSTN) or an Integrated Services Digital Network (ISDN) to dial to a mobile communication system.

Mobile communication network includes wireless access network and core network. When a user uses a service, the mobile communication user is identified in a core network according to the number information of MSISDN, IMSI and IMEI. In a wireless access network, the card and terminal used by a mobile communication user is identified according to the number information of IMSI and IMEI. Therefore, during information tracing process, a network element generally identifies a traced user and realizes information trace on the traced user according to the IMSI number information or the IMEI number information of the user.

Because a mobile communication user generally knows only the mobile terminal number, i.e., MSISDN number, and does not know the IMSI and IMEI number, the user can only provides the MSISDN number when a complaint is made. In the prior art, information trace is started according to the IMEI or IMSI number of a traced user after the corresponding IMEI or IMSI number is determined beforehand according to the MSISDN number of the user. The advanced number conversion greatly lowers the processing efficiency of the trace service, and this problem is especially prominent when there are a large number of user complaints.

SUMMARY OF THE INVENTION

In order to increase the processing efficiency of information trace, an embodiment of the invention provides a method for controlling information trace and a core network element.

A method for controlling information trace, including:

receiving, by a first core network element, a trace command that contains MSISDN number information of a traced user, the trace command further contains identification information of a wireless access network element that needs to start trace function and/or identification information of a second core network element that needs to start trace function;

determining, by the first core network element, IMSI number information and/or IMEI number information corresponding to the MSISDN number information of the traced user, according to a corresponding relationship of user number information; and sending, by the first core network element, a trace command that contains the IMSI and/or IMEI number information of the traced user to each wireless access network element that needs to start trace function and/or each second core network element that needs to start trace function, according to the identification information of the wireless access network element and/or the identification information of the second core network element.

Moreover, the trace command received by the first core network element further includes a sending condition for sending a trace command to the wireless access network element and/or second core network element; and when the corresponding sending condition is met, the first core network element sends the trace command that contains the IMSI and/or IMEI number information of the traced user to the wireless access network element and/or second core network element.

Furthermore, the trace command received by the first core network element further includes: a starting condition for a wireless access network element that needs to start trace function and/or a second core network element that needs to start trace function to start information trace function; and the trace command sent by the first core network element to the wireless access network element and/or the second core network element further includes: a starting condition for the wireless access network element that receives the trace command and/or the second core network element that receives the trace command to start information trace function.

A core network element, including:

an obtaining unit, adapted to obtain a corresponding relationship of user number information;

a receiving unit, adapted to receive a trace command that contains MSISDN number information of a traced user, the trace command further contains identification information of a wireless access network element that needs to start trace function and/or identification information of a core network element that needs to start trace function;

a determining unit, adapted to determine IMSI number information and/or IMEI number information corresponding to the MSISDN number information of the traced user in the trace command, according to the corresponding relationship of user number information; and a sending unit, adapted to send a trace command that contains the IMSI and/or IMEI number information of the traced user to each wireless access network element that needs to start trace function and/or each core network element that needs to start trace function, according to the identification information of the wireless access network element and/or the identification information of the core network element.

Moreover, the determining unit is further adapted to determine a sending condition for sending a trace command to the wireless access network element and/or second core network element that is contained in the trace command; and when the sending condition is met, the sending unit sends the trace command that contains the IMSI number information and/or IMEI number information of the traced user to the wireless access network element and/or second core network element.

A method for controlling information trace, including:

receiving, by a core network element, a trace command that contains MSISDN number information of a traced user;

determining, by the core network element, IMSI number information and/or IMEI number information corresponding to the MSISDN number information of the traced user, according to a corresponding relationship of user number information; and starting, by the core network element, information trace function, and recording information of the traced user according to the IMSI number information and/or the IMEI number information.

Moreover, the trace command received by the core network element further includes a starting condition for starting information trace function; and the core network element starts information trace function when the starting condition is met.

A core network element, including:

an obtaining unit, adapted to obtain a corresponding relationship of user number information;

a receiving unit, adapted to receive a trace command that contains MSISDN number information of a traced user;

a determining unit, adapted to determine IMSI number information and/or IMEI number information corresponding to the MSISDN number information of the traced user in the trace command, according to the corresponding relationship of user number information; and a tracing unit, adapted to start information trace function and record information of the traced user according to the IMSI number information and/or the IMEI number information.

For the method for controlling information trace and the core network element of the embodiments of the invention, information trace may be started according to the MSISDN number information provided by a user, the corresponding IMSI number information and/or IMEI number information may be determined by the core network element according to the corresponding relationship of user number information, and user information is traced according to the IMSI number information and/or IMEI number information on a core network element or wireless access network element that performs information trace. Therefore, when a user requires to be performed information trace, only MSISDN number information needs to be provided. Moreover, during information trace, it does not need to determine the corresponding IMSI number information and/or IMEI number information according to the MSISDN number information on a network management system beforehand, thus the working load of the network management system may be reduced, the efficiency of information trace processing may be increased, and the error probability caused by the manual input of IMSI and/or IMEI number information may be reduced.

DETAILED DESCRIPTION OF THE EMBODIMENTS

Figure 1:
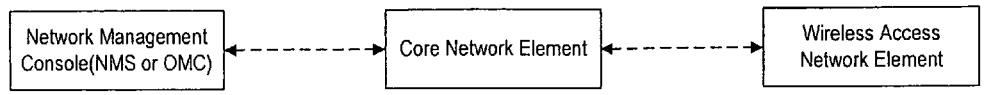
FIG. 1 is a schematic diagram showing an architecture of a communication network applied in Embodiment 1 of the invention.

The network architecture of mobile communication network includes wireless access network and core network. According to different mobile communication standards, the wireless access network and the core network includes wireless access network elements with different functions and core network elements with different functions, respectively. For example, for mobile communication systems such as GSM and WCDMA, the core network includes network elements such as Mobile Service Switch Center (MSC), Serving General Packet Radio Service (GPRS) Support Node (SGSN) and Gateway GPRS Support Node (GGSN). The wireless access network includes network elements such as Radio Network Controller (RNC) and Node B. According to different failure reasons that cause user complaint, the network elements that need to start information trace may include core network element and wireless access network element, or may include only core network element or wireless access network element. The network element that performs information trace identifies a traced user according to the IMEI number information or IMSI number information of the mobile communication user. Because a core network element may obtain a corresponding relationship of user number information from network elements such as Home Location Register (HLR) or Home Subscriber Server (HSS), where the corresponding relationship of user number information specifically includes a corresponding relationship among MSISDN number information, IMEI number information and IMSI number information. Therefore, in the technical solution of information trace according to the embodiments of the invention, the MSISDN number information of a traced user is contained in an information trace starting command that is sent to the core network element, the core network element automatically queries the corresponding relationship of user number information obtained, determines the IMEI and IMSI number information corresponding to the MSISDN number information of the traced user, and continues with the subsequent information tracing process using the IMEI number information and IMSI number information. Thus, the processing efficiency of information trace may be increased.

Moreover, the corresponding relationship of user number information obtained by the core network element may also be a corresponding relationship between MSISDN number information and IMEI number information, and the subsequent information tracing process may be continued according to the IMEI number information corresponding to the MSISDN number information of the traced user; or, the corresponding relationship of user number information obtained by the core network element may also be a corresponding relationship between MSISDN number information and IMSI number information, and the subsequent information tracing process may be continued according to the IMSI number information corresponding to the MSISDN number information of the traced user.

A method for controlling information trace according to an embodiment of the invention includes the following processes:

Process 1, a first core network element receives a trace command that contains MSISDN number information of a traced user, the trace command further contains identification information of a wireless access network element and/or identification information of a second core network element that needs to start trace function;

Process 2, the first core network element determines IMSI number information and/or IMEI number information corresponding to the MSISDN number information of the traced user, according to a corresponding relationship of user number information; and Process 3, the first core network element sends a trace command that contains the IMSI and/or IMEI number information of the traced user to each wireless access network element and/or second core network element that needs to start trace function, according to the identification information of the wireless access network element and/or the identification information of the second core network element.

The invention now be illustrated in detail by taking the case that the core network element continues with the information tracing process according to the IMSI number information corresponding to the MSISDN number information as an example, in conjunction with the drawings.

EMBODIMENT 1

In Embodiment 1, the network element that needs to start information trace includes wireless access network element. Referring to the schematic diagram of an architecture of a mobile communication network shown in FIG. 1, the mobile communication network includes:

a network management console, adapted to sending a trace command that contains MSISDN number information of a traced user to a core network element;

at least one core network element, which communicates with the network management console, adapted to receive the trace command that contains the MSISDN number information of the traced user, determine the corresponding IMSI number information according to the MSISDN number information, and send a trace command that contains the IMSI number information to the related wireless access network element; and at least one wireless access network element, which communicates with the core network element, adapted to receive the trace command that contains the IMSI number information and start trace function.

Figure 2:
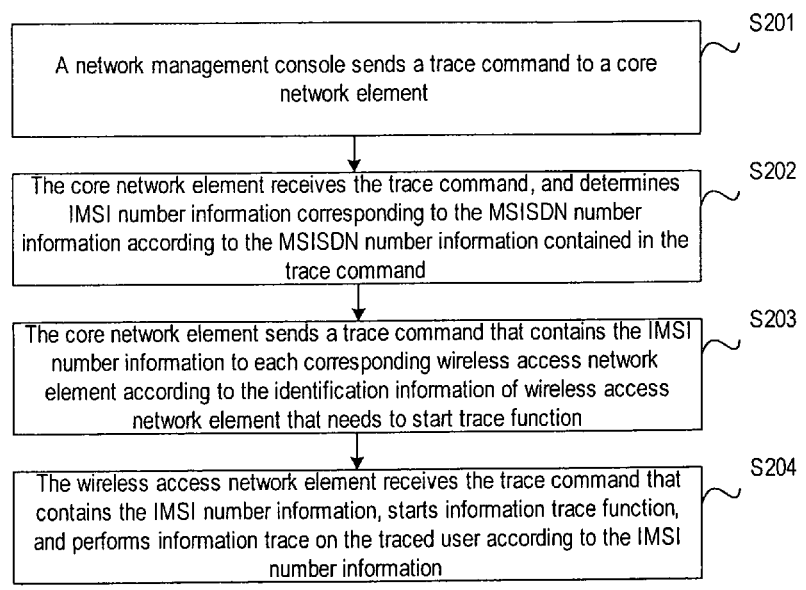
FIG. 2 is a basic schematic flow chart of a method for controlling information trace according to Embodiment 1 of the invention.

The basic flow chart of a method for controlling information trace according to Embodiment 1 of the invention is as shown in FIG. 2, the method includes the following processes:

Process S201: A network management console sends a trace command, which contains MSISDN number information of a traced user and identification information of a wireless access network element that needs to start trace function, to a core network element;

Process S202: The core network element receives the trace command, and determines IMSI number information corresponding to the MSISDN number information in the trace command according to the MSISDN number information contained in the trace command;

Process S203: The core network element sends a trace command that contains the IMSI number information to each corresponding wireless access network element according to the identification information of wireless access network element that needs to start trace function;

Process S204: After the wireless access network element receives the trace command that contains the IMSI number information, it starts information trace function and performs information trace on the traced user according to the IMSI number information.

Taking a WCDMA communication system as an example, the core network element may be MSC, and the wireless access network element that needs to start trace function may be RNC.

EMBODIMENT 2

Based on Embodiment 1, user information trace may be started via a plurality of core network elements, thus the network management console sends a trace command to each core network element. In addition to the MSISDN number information of the traced user, each trace command further contains identification information of a wireless access network element on which the corresponding core network element needs to further starts a trace function. Each core network element respectively determines the corresponding IMSI number information according to the MSISDN number information in the trace command, and sends a trace command that contains the IMSI number information to the wireless access network element. Where, the process in which the network management console starts a wireless access network element via each core network element to perform information trace is the same as that of Embodiment 1, so it will not be described again here.

EMBODIMENT 3

Based on Embodiment 1 or Embodiment 2, the trace command sent by the network management console to the core network element may further contain identification information of other core network elements that need to start trace function. After the core network element that receives the trace command from the network management console determines the corresponding IMSI number information according to the MSISDN number information in the trace command, it further needs to send a trace command that contains the IMSI number information to the corresponding other core network elements according to the identification information of other core network elements; after said other core network elements receive the trace command that contains the IMSI number information, they start information trace function according to the IMSI number information and perform information trace on the traced user. One skilled in the art may determine the specific realization process according to Embodiment 1, so it will not be described again in detail here.

EMBODIMENT 4

In Embodiment 4, the network element that needs to start information trace may also include core network element only, without including wireless access network element, thus the network management console sends a trace command that contains the MSISDN number information of a traced user to each core network element, and the core network element determines the IMSI number information corresponding to the traced user according to the MSISDN number information in the trace command, starts information trace function, and performs information trace on the traced user according to the IMSI number information. Or, the network management console may issue a trace command, which contains the identification information of other core network elements that need to start information trace function, to other core network elements via one core network element thereof.

Embodiment 1, Embodiment 2, Embodiment 3 or Embodiment 4 shows the specific implementation of a management-based method for controlling information trace. It should be noted that, in the management-based method for controlling information trace, the trace command sent by the network management console may also contain a starting condition for starting information trace function corresponding to each network element that performs information trace, and the network element that performs information trace starts information trace function when the corresponding condition contained in the trace command is met.

EMBODIMENT 5

Figure 3:
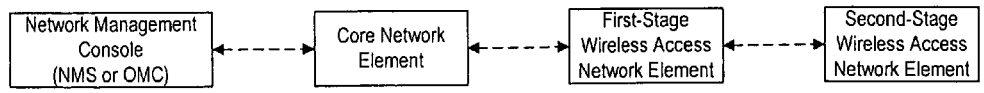
FIG. 3 is a schematic diagram showing an architecture of a communication network applied in Embodiment 5 of the invention.

Embodiment 5 is a specific embodiment of a signaling-based method for controlling information trace. Referring to the schematic diagram of an architecture of a mobile communication system network shown in FIG. 3, which includes: a network management console, a core network element, a first-stage wireless access network element and a second-stage wireless access network element. The network management console communicates with the core network element, the core network element communicates with the first-stage wireless access network element, and the second-stage wireless access network element communicates with the first-stage wireless access network element. There may exist two or more first-stage wireless access network elements and second-stage wireless access network elements respectively.

Figure 4:
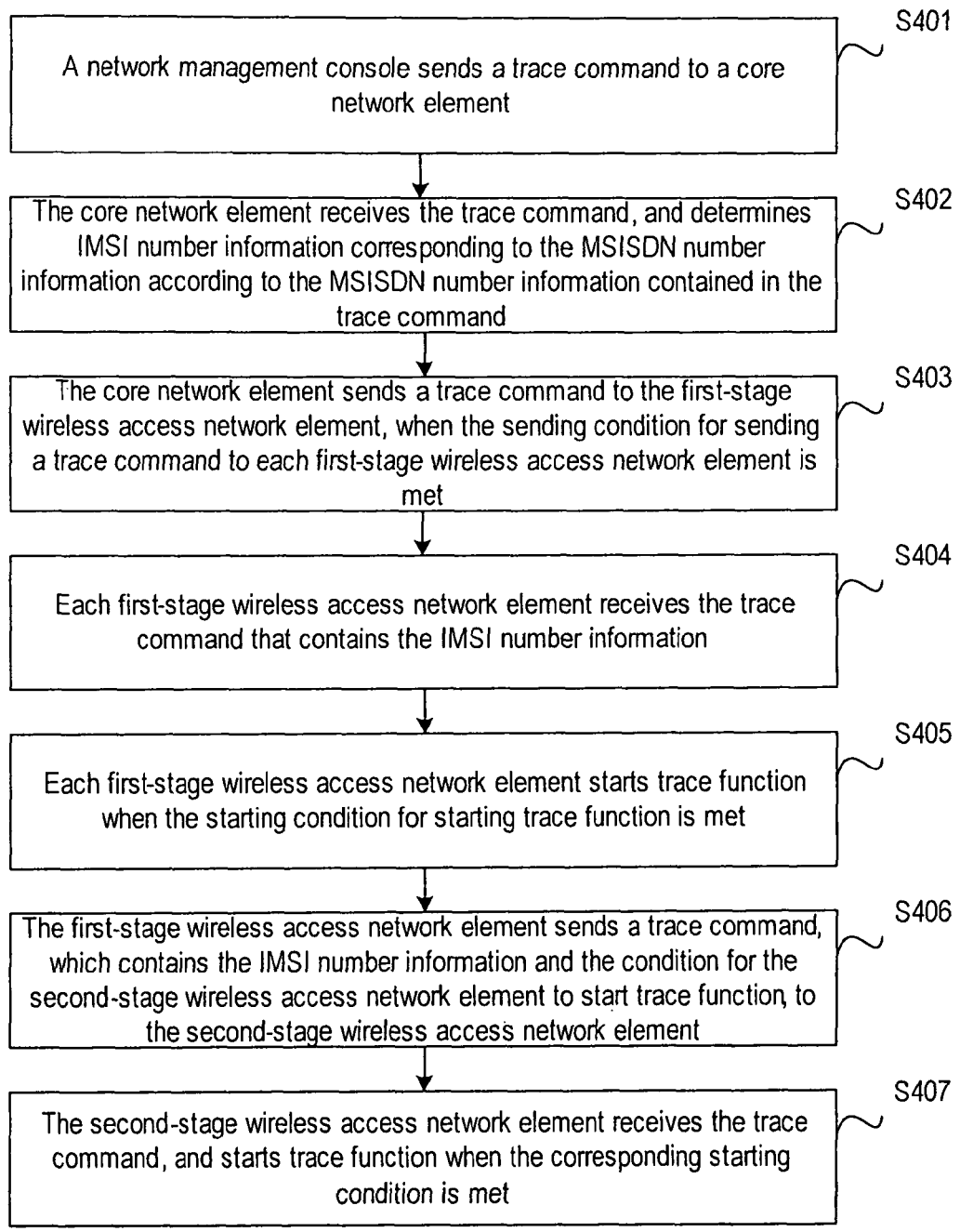
FIG. 4 is a basic schematic flow chart of a method for controlling information trace according to Embodiment 5 of the invention.

The method for controlling information trace according to Embodiment 5 is as shown in FIG. 4, which includes the following processes:

Process 401: A network management console sends a trace command, which contains MSISDN number information of a traced user, identification information of first-stage wireless access network element on which the core network element needs to further start trace function, a sending condition for sending a trace command to each first-stage wireless access network element and a starting condition for each first-stage wireless access network element to start trace function, to a core network element;

Process 402: The core network element receives the trace command and determines IMSI number information of the traced user according to the MSISDN number information contained in the trace command;

Process 403: The core network element sends a trace command, which contains the starting condition for the first-stage wireless access network element to start trace function, to the corresponding first-stage wireless access network element, when the sending condition for sending a trace command to each first-stage wireless access network element is met;

Process 404: Each first-stage wireless access network element receives a trace command that contains the IMSI number information;

Process 405: Each first-stage wireless access network element starts trace function when the starting condition for starting trace function is met.

In Embodiment 5, in addition to the first-stage wireless access network element on which the core network element further starts trace function, if each first-stage wireless access network element further needs to start a second-stage wireless access network element to perform information trace, thus the trace command sent by the network management console to the core network element in Process S401 needs to further contain identification information of the second-stage wireless access network element on which the first-stage wireless access network element needs to further starts trace function thereof, a condition for sending a trace command to each second-stage wireless access network element and a condition for each second-stage wireless access network element to start trace function; then, in Process S403, the trace command sent by the core network element to each first-stage wireless access network element further contains the identification information of the second-stage wireless access network element on which the first-stage wireless access network element needs to further start trace function, the condition for sending a trace command to each second-stage wireless access network element and the condition for each second-stage wireless access network element to start trace function; then, the method for controlling information trace further includes the following processes:

Process 406: When the condition for sending a trace command to the second-stage wireless access network element is met, the first-stage wireless access network element that starts trace function sends a trace command, which contains the IMSI number information and the condition for the second-stage wireless access network element to start trace function, to the second-stage wireless access network element; and Process 407: After the second-stage wireless access network element receives the trace command, it starts trace function when the corresponding starting condition is met.

The realization method for the third-stage or upper-stage wireless access network element to start information trace function is the same, so it will not be described again here. Moreover, the core network element may also start information trace function stage by stage. One skilled in the art may set the specific starting stages of the core network elements or wireless access network elements as required.

Still taking WCDMA communication system as an example, the core network element may be SGSN, the first-stage wireless access network element that needs to start trace function may be RNC, and the second-stage wireless access network element may be Node B.

In all the above embodiments, the core network element may also determine the corresponding IMEI number information according to the MSISDN number information in the trace command, thus the trace command issued subsequently may contain the IMEI number information. Or, the core network element may also determine the IMSI number information and the IMEI number information respectively according to the MSISDN number information in the trace command, thus the trace command issued subsequently may contain the IMSI number information and the IMEI number information at the same time. The MSISDN number information contained in the trace command may be the MSISDN number itself, or it may also be the coding information corresponding to the MSISDN number uniquely or the coding information calculated according to the MSISDN number, etc. The same principle is applicable to the IMSI number information or IMEI number information contained in the trace command.

In all the above embodiments, the network management console may be a Network Management System (NMS), and it may also be an Operation and Maintenance Centre (OMC).

Figure 5:
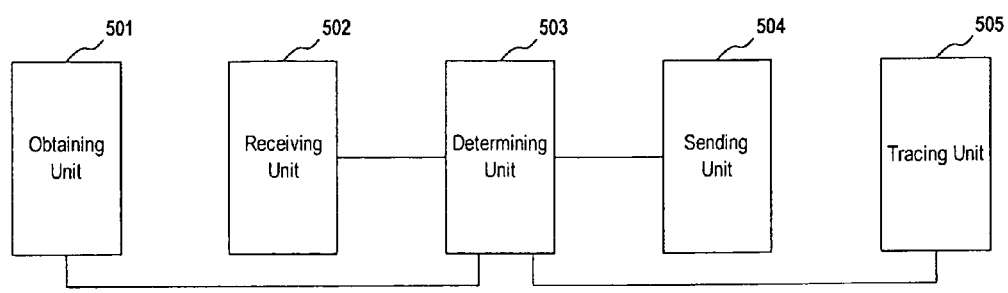
FIG. 5 and FIG. 6 are schematic diagrams showing the main structure of a core network element according to the embodiments of the invention.

As shown in FIG. 5, it is a schematic diagram showing the main structure of a core network element according to an embodiment of the invention, which includes:

an obtaining unit 501, adapted to obtain a corresponding relationship of user number information; where, a communication interface exists between the obtaining unit 501 and the network element that stores the corresponding relationship of user number information, such as HLR or HSS, the communication interface is adapted to obtain the corresponding relationship of user number information from the network element such as HLR or HSS;

a receiving unit 502, adapted to receive a trace command that contains MSISDN number information of a traced user and identification information of a network element that needs to start trace function; where, the network element that needs to start trace function may include the core network element that receives a trace command containing the MSISDN number information of a traced user, and other core network elements, and it may also include a wireless access network element;

a determining unit 503, adapted to determine IMSI number information and/or IMEI number information corresponding to the MSISDN number information of the traced user in the trace command according to the corresponding relationship of user number information; and a sending unit 504, adapted to send a trace command, which contains the IMSI number information and/or IMEI number information of the traced user, to each network element that needs to start trace function, according to the identification information of each network element that needs to start trace function.

Moreover, when the trace command further includes a sending condition for sending a trace command to other network elements, the determining unit is further adapted to determine the sending condition contained in the trace command; and when the sending condition is met, the sending unit sends a trace command, which contains the IMSI number information and/or IMEI number information of the traced user, to each network element.

Figure 6:
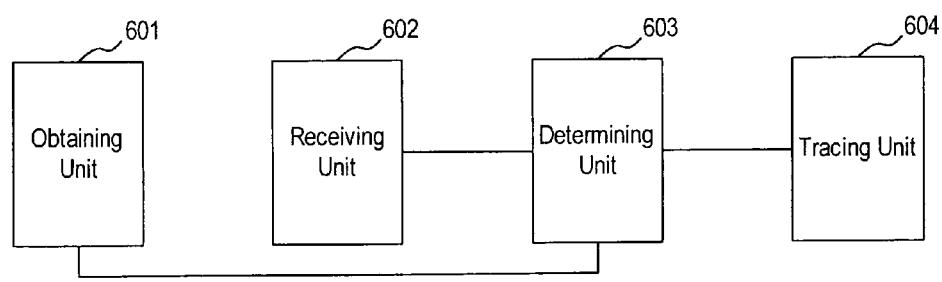

Moreover, as shown in FIG. 6, it is a schematic diagram showing the main structure of another core network element according to an embodiment of the invention, which includes:

an obtaining unit 601, adapted to obtain a corresponding relationship of user number information;

a receiving unit 602, adapted to receive a trace command that contains MSISDN number information of a traced user;

a determining unit 603, adapted to determine IMSI number information and/or IMEI number information corresponding to the MSISDN number information of the traced user in the trace command according to the corresponding relationship of user number information; and a tracing unit 604, adapted to start information trace function and record information of the traced user according to the IMSI number information and/or the IMEI number information.

The core network element shown in FIG. 6 starts information trace function according to the trace command received, and it does not need to send a trace command to other network elements. The core network element shown in FIG. 5 may also include a tracing unit 505, when the core network element that receives the trace command which contains MSISDN number information of a traced user also needs to perform information trace task, information trace function is started. Moreover, if the trace command further includes a starting condition, the determining unit 503 is further adapted to determine the starting condition included in the trace command; and when the starting condition is met, the tracing unit 505 starts information trace function.

In the embodiments of the invention, a core network element automatically determines the IMSI and/or IMEI number information according to the MSISDN number information. Therefore, when a user requires to be performed information trace, only MSISDN number information needs to be provided. Moreover, during information trace, no information needs to be recorded or converted on a network management system according to the MSISDN number information, thus the working load of the network management system may be reduced, the efficiency of information trace processing may be increased, and the error probability caused by the manual input of IMSI and/or IMEI number information may be reduced.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

The invention claimed is:

1. A method for controlling information trace, comprising:
   receiving, by a first core network element, a trace command that contains MSISDN number information of a traced user, the trace command further contains identification information of a wireless access network element that needs to start trace function and/or identification information of a second core network element that needs to start trace function;
   determining, by the first core network element, IMSI number information and/or IMEI number information corresponding to the MSISDN number information of the traced user, according to a corresponding relationship of user number information; and
   sending, by the first core network element, a trace command that contains the IMSI and/or IMEI number information of the traced user to a wireless access network element that needs to start trace function and/or a second core network element that needs to start trace function, according to the identification information of the wireless access network element and/or the identification information of the second core network element;
   wherein the trace command received by the first core network element further comprises a sending condition for sending a trace command to the wireless access network element and/or second core network element; and
   when the corresponding sending condition is met, the first core network element sends a trace command that contains the IMSI and/or IMEI number information of the traced user to the wireless access network element and/or second core network element.

2. The method of claim 1, wherein:
   the trace command received by the first core network element further comprises: a starting condition for a wireless access network element that needs to start trace function and/or a second core network element that needs to start trace function to start information trace function; and
   the trace command sent by the first core network element to the wireless access network element and/or second core network element further comprises: a starting condition for the wireless access network element that receives the trace command and/or second core network element that receives the trace command to start information trace function.

3. The method for controlling information trace of claim 2, further comprising: starting, by the wireless access network element and/or second core network element, information trace function, when the starting condition of information trace function is met.

4. A core network element, comprising:
- an obtaining unit, adapted to obtain a corresponding relationship of user number information;
- a receiving unit, adapted to receive a trace command that contains MSISDN number information of a traced user, the trace command further contains identification information of a wireless access network element that needs to start trace function and/or identification information of a core network element that needs to start trace function;
- a determining unit, adapted to determine IMSI number information and/or IMEI number information corresponding to the MSISDN number information of the traced user in the trace command, according to the corresponding relationship of user number information; and
- a sending unit, adapted to send a trace command that contains the IMSI and/or IMEI number information of the traced user to each wireless access network element that needs to start trace function and/or each core network element that needs to start trace function, according to the identification information of the wireless access network element and/or the identification information of the core network element,
- wherein the determining unit is further adapted to determine a sending condition for sending a trace command to the wireless access network element and/or second core network element that is contained in the trace command; and
- when the sending condition is met, the sending unit sends the trace command that contains the IMSI number information and/or IMEI number information of the traced user to the wireless access network element and/or second core network element.

5. The core network element of claim 4, further comprising:
- a tracing unit, adapted to start information trace function and record information of the traced user according to the IMSI number information and/or the IMEI number information.

6. The core network element of claim 5, wherein the determining unit is further adapted to determine a starting condition for starting information trace function that is further comprised in the trace command received, and the tracing unit starts information trace function when the starting condition is met.

* * * * *